Figure 1:
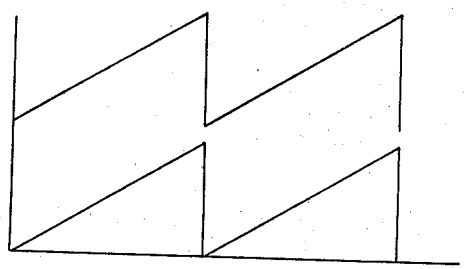

Feb. 18, 1941. B. NEWSAM 2,232,076
ELECTRICAL CIRCUITS FOR INTEGRATING ELECTRICAL VARIATIONS
Filed April 6, 1938 2 Sheets-Sheet 1

INVENTOR
BERNARD NEWSAM
BY

ATTORNEY

Patented Feb. 18, 1941

2,232,076

UNITED STATES PATENT OFFICE 2,232,076

ELECTRICAL CIRCUITS FOR INTEGRATING ELECTRICAL VARIATIONS

Bernard Newsam, London, England, assignor to International Standard Electric Corporation, New York, N. Y.

Application April 6, 1938, Serial No. 200,445
In Great Britain April 14, 1937

3 Claims. (Cl. 250—36)

This invention relates to a method of and electrical circuits for producing currents or voltages of desired wave form and is a modification of the invention described and claimed in the U. S. Application of Beale and Stansfield Ser. No. 69,808, filed March 20, 1936.

In the latter specification there is described apparatus for producing from electrical variations of a given wave form, electrical variations having a wave form which is an integration or a differentiation of the given wave form, in which an elementary integrating or differentiating circuit e. g. in the case of integration a resistance in series and a condenser in shunt and is included in a thermionic amplifier and a compensating voltage which is in such phase relation and has such amplitude as to give a substantially true integration or differentiation of the given wave form is fed back from the output of said amplifier to the input.

This was accomplished in the specific examples given by arranging an elementary differentiating or integrating circuit in the output circuit of one thermionic valve and in the input circuit of a second thermionic valve, and feeding back a certain proportion of the output voltage from the output of the latter to the input of the former, the electric waves to be integrated or differentiated being applied to the input circuit of the first thermionic valve.

The effect of this was to feed back part of the potential across the output of the elementary differentiating or integrating circuit and so to add this potential to the potential difference being differentiated or integrated.

The present invention applies a similar principle in order to obtain a uniform current or a uniform increase of current from a direct current source when there is a reactance in the circuit.

According to this invention we obtain a uniform flow of current from a D. C. source into a capacitative reactance or a uniform increase of current in an inductive reactance in a circuit containing also resistance by feeding back the potential across a portion of the circuit in series with the D. C. source.

One application of this invention is to a circuit for obtaining a uniformly increasing voltage or current for the purpose of traversing the beam of electrons in a cathode ray oscillograph in a uniform manner with respect to time.

Figure 2:
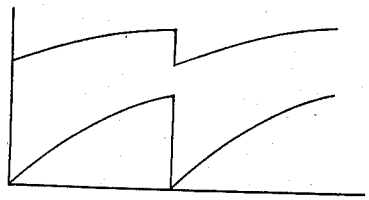
Figure 3:
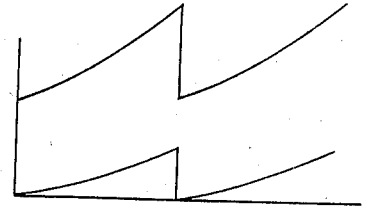
Figure 6:
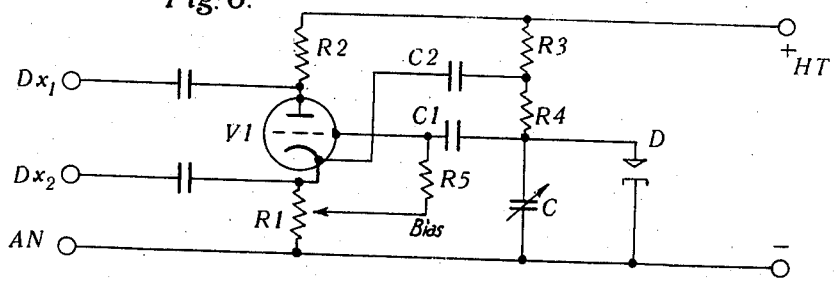
Figure 6:
Figure 4:
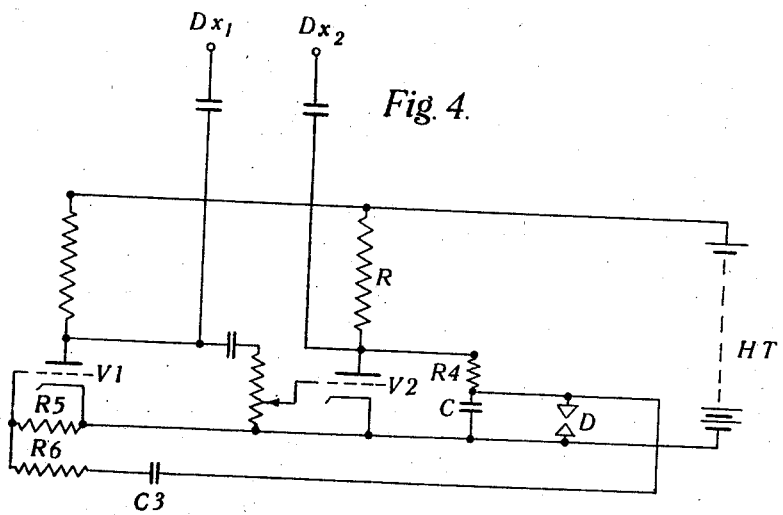
Figure 5:
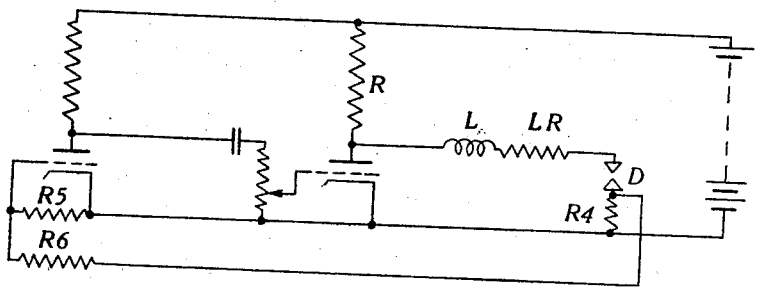

The nature of the invention will be better understood from the following description of certain embodiments thereof, taken in conjunction with the accompanying drawings in which:

Figs. 1, 1A, 2 and 3 are diagrams for explaining the application of the invention to circuits for producing a saw-tooth wave form; and Figs. 4, 5 and 6 are diagrams of circuits for producing such wave forms.

Figure 1A:
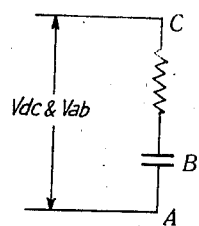

Referring to the drawings, it is well known that if a condenser B, Fig. 1A be charged through a resistance from a D. C. source the variation with time of the voltage across the condenser follows an exponential curve. This is due to the voltage across the condenser opposing the voltage across the resistance and in consequence reducing the charging current. It is usual, therefore, instead of charging the condenser through an ohmic resistance, to charge it through a device through which the current remains constant despite a variation in the voltage applied thereto, such as a pentode valve working under appropriate conditions. This results in a voltage cross the condenser which varies in a nearly linear manner with time, but the compensation is not exact.

By means of the present invention we retain an ohmic resistance through which to charge the condenser but we maintain the voltage across the resistance constant. This is obtained by superimposing upon the constant voltage applied to the resistance and condenser an exact replica of the voltage across the condenser. Thus if $V_{DC}$ be the (constant) voltage of the D. C. source and $V_{ab}$ be the (varying) voltage across the condenser, we apply a voltage of $V_{DC}+V_{ab}$ across both resistance and condenser. Then the voltage across the resistance is $V_{DC}+V_{ab}-V_{ab}$ i. e. $V_{DC}$ which is a constant.

The effect of this is illustrated in Fig. 1 which shows the variation with time of the voltages across the points AC of Fig. 1A in the upper curve and the resultant variation of the voltage across the condenser B in the lower curve, when this condenser is periodically discharged to reduce the voltage across it to zero. Since the voltage across the resistance is a constant each ordinate of the lower curve differs from the corresponding ordinate of the upper curve by a constant amount and assuming there is no extraneous source of distortion in the circuits connected to Fig. 1A the rising portions of both curves are exactly linear. Extraneous sources of disturbance may exist and may be compensated by an increase or decrease of the voltage superposed on that of the D. C. source. Thus, if the superposed voltage is less than $V_{ab}$ an under compensated wave as shown in Fig. 2, if greater than V$_{ab}$ an over compensated wave as shown in Fig. 3 will result. In each of these figures the upper curve is the voltage across A and C in Fig. 1A and the lower curve the voltage across the condenser only.

Fig. 4 shows a form of circuit according to the invention applied to the purpose of securing a linear increase with time of voltage across the condenser C. The condenser C is charged from the battery HT through the resistances R and R4. One side of condenser C is connected to the cathodes of valves V1 and V2 and to the negative pole of battery HT, the other side is connected through a condenser C3 and resistance R6 to the grid of the three electrode thermionic valve V1 having a suitable resistance R5 in its grid cathode circuit. Valve V1 is resistance capacity coupled to a second valve V2 in the plate circuit of which is the resistance R. In this way there is added to the direct voltage across the resistance R4 and condenser C derived from the battery HT a voltage which bears the desired ratio to the voltage across condenser C. The amplification of the two valve amplifier V1, V2 is adjusted to add to the voltage across the resistance R4 and condenser C derived from the battery HT a variation in the voltage in resistance R which is either exactly equal to that across condenser C or a little greater or less as previously described with reference to Figs. 1 to 3. A discharge device D is, as usual, connected across the condenser C and discharges that condenser as rapidly as possible as soon as the voltage across it reaches a predetermined value.

Two valves are used in order to give a balanced sweep circuit in a cathode ray tube. The final anode of the cathode ray tube is connected to the common cathode circuit of the valves V1 and V2 which may be grounded whilst the deflecting plates Dx1 and Dx2 are connected to the anodes of the respective valves V1 and V2 through suitable condensers since the potential of these anodes varies in opposite directions.

Fig. 5 shows the application of the invention to secure a current in an inductance increasing linearly with time. The inductance L in this case consists of the magnetic deflecting coils of a cathode ray tube the resistance LR of these coils being represented as in series therewith.

This case corresponds with the circuit for effecting a true differentiation described in application Ser. No. 69,808, the previous case (Fig. 4) corresponding with the circuit for integration. In the circuit of Fig. 5, therefore, the voltage across the inductance coils is maintained constant. In the circuit shown current passes through the deflecting coils when the discharge device D is conducting. To the constant voltage V$_{DC}$ across the inductance L, its resistance LR and a resistance R4 in series therewith is added the voltage V$_{R4}$ across the resistance R4 so that the total voltage impressed across inductance L and resistance LR and R4 is V$_{DC}$+V$_{R4}$. The voltage across the inductance L and resistance LR is then V$_{DC}$ a constant. In the familiar equation $$l\frac{di}{dt}+ri=e$$

e becomes a constant and therefore $$l\frac{di}{dt}$$

is a constant and the current rises linearly with time.

Fig. 6 shows a circuit by means of which a balanced sweep may be obtained by means of only one thermionic valve V1. This is accomplished by dividing the resistance R1, R2 in the anode circuit of the valve and placing part of this resistance (R1) between the cathode and the condenser C, the voltage across which is to determine the deflection of the electron beam. The condenser C is charged from the constant source HT through resistances R3 and R4. The voltage across condenser C is applied through condenser C1 across the grid and cathode of the valve V1 and resistance R1. A point on resistance R1 is connected through a high resistance R5 to the grid of the valve to apply an appropriate grid bias. The output of valve V1 is taken from the terminals of resistances R1 and R2 and applied across the resistances R3 and R4 and condenser C. The connection shown is used to obtain a ratio of amplification which is almost one. The deflecting plates Dx1 and Dx2 are connected through condensers to the anode and cathode of valve V1, whilst the anode AN of the cathode ray tube is connected to the negative end of the resistance R1. In order to secure an accurately balanced sweep the values of the resistances R1, R2 and R3 are so proportioned that $$R_2=\frac{R_1R_3}{R_1+R_3}$$

If (V$_{OUT}$) is the output voltage of valve V1 applied across resistances R3 and R4 and condenser C, and V$_{IN}$ be the input voltage:

$$V_{(OUT)}=V_{(IN)}\frac{UR1}{(U+1)R_1+R_2+Z}$$

where U is the amplification factor of the valve and Z its plate impedance. The effective amplification in this case must therefore always be less than unity, and the exponential charging curve is undercompensated. The compensation may, however, be made very close to unity. In a typical case R1 and R2 were each chosen as 50,000 ohms, R3 was therefore 250,000 ohms. Using a valve having an amplification factor of 80 and a plate impedance 13,300 ohms, the ratio of compensation is 0.99. In this case R4 was chosen as 250,000 ohms, and the condenser C as variable between 0.01 and 0.005.

What is claimed is:

1. An apparatus for obtaining a saw tooth wave form comprising a series circuit of a resistance serially connected to the shunt combination including at least a condenser and a second resistance, a direct current source connected across said series circuit to charge said condenser, a variable impedance connected across at least a portion of said first resistance through at least another impedance and means for decreasing the impedance of said variable impedance as the charge on said condenser increases whereby the voltage on said terminals of said condenser is caused to increase at a predetermined rate.

2. A sweep circuit comprising a first circuit branch including a condenser and a first resistance connected in series with each other, a potential source having a negative terminal connected to said condenser and a positive terminal connected to said first resistance, a second circuit branch connected across said terminals including a space discharge path and a second resistance in series therewith between said path and said negative terminal, a connection from a point of said first resistance remote from said positive terminal to a point of said second resistance remote from said negative terminal, a control conductor connected to said first branch intermediate said condenser and said positive terminal, and means for increasing the conductivity of said space path, responsive to increasing positive potential of said control conductor.

3. An apparatus for obtaining a saw tooth wave form having a linear increase of voltage with time comprising a thermionic valve and a condenser, a resistance interconnected between the cathode of said valve and one terminal of said condenser, a second resistance connected to the other terminal of said condenser, a source of direct current connected across the series circuit formed by said condenser and said second resistance and likewise across the series circuit formed by said first resistance and the output circuit of said valve, and a connection for applying the voltage of said condenser across said other terminal of said condenser and the grid of said valve, and a further connection from an intermediate point of said first resistance to said cathode.

BERNARD NEWSAM.